United States Patent [19]

McCormack et al.

[11] 4,136,715
[45] Jan. 30, 1979

[54] COMPOSITE ARTICLE FROM ORIENTED COPOLYETHERESTER ELASTOMERS

[75] Inventors: Charles E. McCormack, Wilmington, Del.; Martin L. Brown, Elkton, Md.

[73] Assignee: E. I. Du Pont de Nemours and Company, Wilmington, Del.

[21] Appl. No.: 791,941

[22] Filed: Apr. 28, 1977

Related U.S. Application Data

[62] Division of Ser. No. 509,733, Sep. 26, 1974.

[51] Int. Cl.$^2$ .................. F16L 11/00; F16L 11/04
[52] U.S. Cl. ................................ 138/130; 138/141; 138/177
[58] Field of Search .............. 138/130, 137, 141, 144, 138/177; 428/36

[56] References Cited
U.S. PATENT DOCUMENTS

| | | | |
|---|---|---|---|
| 2,640,501 | 6/1953 | Scott et al. ..................... | 138/130 X |
| 3,037,529 | 6/1962 | Hancik ........................... | 138/144 X |
| 3,362,861 | 1/1968 | Barker et al. .................. | 138/144 X |
| 3,400,029 | 9/1968 | Mesrobian et al. ............ | 138/144 X |
| 3,645,819 | 2/1972 | Fujii et al. ..................... | 156/148 |
| 3,725,192 | 4/1973 | Ando et al. .................... | 138/141 X |
| 3,766,146 | 10/1973 | Witsiepe ........................ | 260/75 R |
| 3,886,024 | 5/1975 | Chase ............................ | 138/141 X |
| 3,914,146 | 2/1974 | Koch ............................. | 138/125 X |

Primary Examiner—Richard E. Aegerter
Assistant Examiner—James E. Bryant, III

[57] ABSTRACT

A composite article fabricated by a process comprising (1) bringing into intimate contact two copolyetherester elastomers having melting points differing by at least 20° C., the copolyetherester elastomer (A) of higher melting point being in the form of a plurality of oriented strands, tapes or films and (2) heating the resulting assembly to a temperature between the melting point of the two elastomers to cause fusion of copolyetherester elastomer (B) of lower melting point while maintaining the orientation of copolyetherester elastomer (A).

1 Claim, 4 Drawing Figures

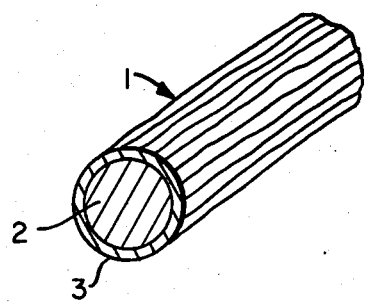
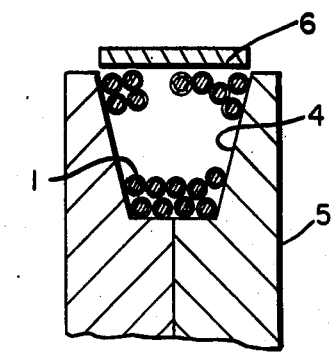
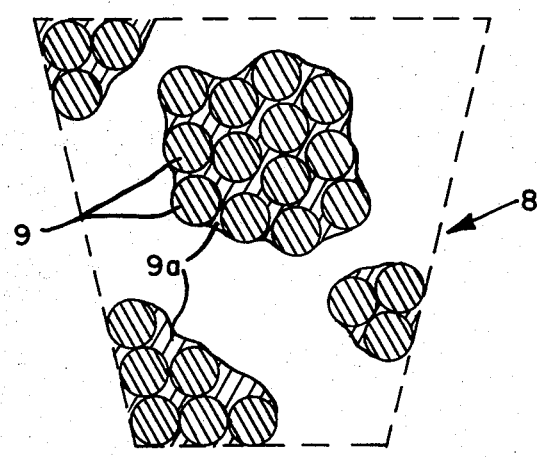
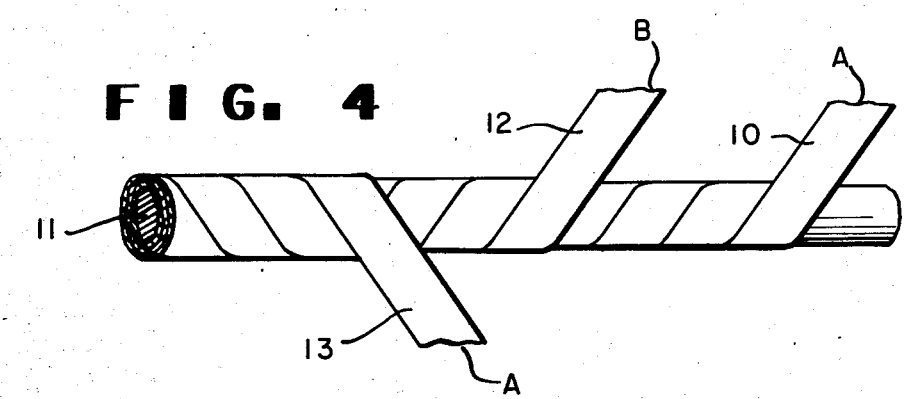

COMPOSITE ARTICLE FROM ORIENTED COPOLYETHERESTER ELASTOMERS

This is a division, of application Ser. No. 509,733, filed Sept. 26, 1974.

BACKGROUND OF THE INVENTION

In the past such rubber products as belting and hose requiring high strength, flexibility and dimensional stability have been produced from various elastomers reinforced with textile fabrics or textile yarns. A disadvantage associated with these prior art products is complexity of fabricating methods which usually involve multiple steps and the handling of several different rubber compounds and coated fabrics or yarns. Furthermore, theremosetting elastomers are generally used which require a time comsuming vulcanization step to develop the properties necessary for durability of the finished product in the end use.

SUMMARY OF THE INVENTION

According to this invention it has been found that a class of copolyetheresters can be employed to form a reinforced elastomeric structure having utility in such products as hose, belting, and sheeting, the structure being composed of two melting point grades of such elastomer, the higher melting point grade being in the form of oriented strands, tapes, or films which constitute the strengthening member, and the lower melting point grade serving primarily as the bonding agent for the oriented strengthening members. The copolyetherester employed as the bonding agent may have essentially the same composition as the strengthening members insofar as being a polymer of the same or essentially the same monomers, but combined in different proportions in order to exhibit lower melting point.

The principal object of the invention is to provide a composite rubber product comprised of two copolyetherester elastomers having melting points differing by at least 20° C., (40° F.), the copolyetherester A of higher melting point being in the form of a plurality of oriented strands, tapes or films, said strands being bound in a unitary structure by unoriented copolyetherester elastomer B of lower melting point.

A further object is to provide an improved process for preparing a composite rubber product exhibiting properties characteristic of rubber products reinforced with textiles.

Another object is to provide an encapsulated structure which employs certain features of the prior art but employs a combination of thermoplastic resins selected to give improved results.

More particularly, the invention described a flexible hose of generally thin wall construction, the hose having a core composed of a helical wrapping of thermoplastic elastomeric tape with adjacent turns overlapping, which core is surrounded by a jacket, the tape which makes up the core is composed of an oriented copolyetherester elastomer and the jacket is composed of a second wrapping of the same elastomeric tape wound helically in the opposite direction, said jacket being separated from the core by an intermediate wrapping of a tape composed of a second copolyetherester elastomer which is wound helically around the core and which has a melting point below that of the core and jacket, the aforesaid elements of the hose being bonded together. Alternatively, the core can be composed of an oriented copolyetherester encapsulated with a second copolyetherester of lower melting point.

SUMMARY OF THE DRAWINGS

FIG. 1 is a view partially in section of a composite strand or filament of the type employed in this invention.

FIG. 2 is a fragmentary section of a form and a power transmission belt at an intermediate step in the fabrication of said belt by the method of the instant invention.

FIG. 3 is a section view of the drive belt fabricated as illustrated in FIG. 2.

FIG. 4 is a perspective view of a portion of hose involving multiple overlapping of adjacent tapes.

DETAILED DESCRIPTION OF THE INVENTION

The composite rubber products of the instant invention are composed of two copolyetherester elastomers having different melting points. In the composite products, the higher melting copolyetherester elastomer A is in the form of a multiplicity of strands, tapes, or films which are monoaxially oriented in the direction of their length, or are biaxially oriented, and the lower melting copolyetherester elastomer B is bonded thereto in an unoriented form, e.g., as a matrix surrounding the individual strands.

In the novel fabrication method of the instant invention, the composite rubber product is shaped by bringing copolyetherester elastomer B and the oriented copolyetherester elastomer A together on a suitable form or in a suitable mold at a temperature below the melting point of elastomer B. The two elastomers are arranged in such a fashion during the lay up of the product that elastomer B, when it becomes fused in the subsequent heating step, adheres adjacent units of elastomer A together.

In one embodiment the two copolyetherester elastomers are maintained in intimate contact and the strands of copolyetherester elastomer A are suitably restrained from retraction as by clamping. The whole assembly is then heated to a temperature which is above the melting point of copolyetherester elastomer B but below the melting point of copolyetherester elastomer A by at least 20° F., since heating at temperatures closer than this to the melting point of copolyetherester A adversely affects its orientation. In this step elastomer B becomes molten and fills the interstices between the strands of elastomer A thereby cementing them together. The temperature to which the assembly is heated is insufficient to cause the strands of elastomer A to lose their orientation. When the configuration of the mold or form upon which the product is fabricated does not inherently restrain the strands, it may be necessary to provide such restraint, as the strands may tend to retract during the heating step and cause deformation of the product.

Although elastomer A must be in mono- or biaxially oriented form elastomer B can be in any convenient form that will provide intimate contact with elastomer A. For example, elastomer B can be in sheet form and can be alternated with layers of oriented strands of elastomer A. On the other hand, strands of elastomer A may be brought together with a powder or elastomer B so that the powder substantially fills the interstices between the individual strands. As another example, elastomer B can have the form of strands shaped similarly to the strands of elastomer A, and strands of A and B can be alternated in the lay up of the product.

A preferred form of elastomer B for use in this invention is as an envelope encapsulating the individual strands of elastomer A. The strand of elastomer A thus encapsulated in elastomer B forms a single, convenient unit of laying up a composite product and greatly simplifies the problem of providing intimate contact. In place of single, individual strands, a composite of several encapsulated strands can be used as a building block for the composite product. The encapsulated strands can be made in a number of ways. For example, an oriented strand of elastomer A is drawn through a molten bath of elastomer B at a temperature above the melting point of elastomer B but below that of elastomer A. Alternatively, the strand of elastomer A can be encapsulated by simultaneous extrusion with elastomer B using processes as described in U.S. Pat. Nos. 3,485,912 and 3,397,428 and then stretching the extrudate to orient the copolyetheresters by the process of Brown & McCormack-2, Ser. No. 455,803, filed Mar. 28, 1974. U.S. Pat. No. 3,485,912 shows an example of a composite of several individual encapsulated strands.

In the process of orienting the copolyetherester elastomer as in Brown & McCormack-2 the copolyetherester strand is stretched by at least 300% of its original length and then subjected to a heat-setting treatment involving maintaining the strand at its stretched length and bringing it to a heat-setting temperature between about 150° and 20° F. below its melting point. However, other degrees and types of orientation may be employed in the present invention. Also the heat-setting treatment can be performed in a separate operation preceding the formation of composite rubber products by the process of this invention. On the other hand, the step in the present invention of heating the assembly of the two copolyetherester elastomers to a temperature between the melting points of the two elastomers is a sufficient heat-setting treatment by itself, providing that in the assembly there are means provided to maintain elastomer A in its stretched state during the heating step.

Although the invention is intended to cover any possible alignment of strengthening members in the product, including random, it is preferred that the strengthening members be primarily aligned in either one or two directions in order that the products will possess the greatest possible strength. For example, for hose which requires strength in two directions, approximately half the members are aligned in one direction and half in a second direction transverse to the first.

The process is advantageously used to make hose by closely wrapping a tape of oriented elastomer A encapsulated in elastomer B on a suitable mandrel. For example, the tapes may be wound in a spiral in a single direction around the mandrel. Alternatively, for increased bursting strength successive spiral windings may be made on the mandrel with the spiral of each winding having a direction opposite to that of the immediately preceding winding. Other methods for making hose from the encapsulated tape would be obvious to those experienced in the art.

The preferred elastomer which is to be treated by the process of the instant invention is a copolyetherester which consists essentially of the multiplicity or recurring intralinear long-chain and short-chain units connected head-to-tail through ester linkages, said long-chain ester units being represented by the following structure.

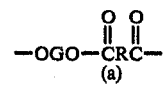

and said short-chain ester units being represented by the following structure:

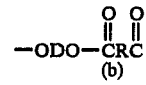

wherein:

G is a divalent radical remaining after removal of terminal hydroxyl groups from poly(alkylene oxide) glycols having a carbon-to-oxygen ratio of about 2.0–4.3 and molecular weight between about 400 and 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the proviso that the short-chain ester units constitute about 10–95% by weight of the copolyetherester and, ergo, the long-chain ester units constitute about 5 to 90% by weight of the copolyetherester.

The term "long-chain ester units" as applied to units in a polymer chain refers to the reaction product of a long-chain glycol with a dicarboxylic acid. Such "long-chain ester units", which are a repeating unit in the copolyetheresters of this invention, correspond to formula (a) above.

Representative long-chain gylcols are poly(ethylene oxide) gylcol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent esterforming derivatives of diols are also useful (e.g., ethylene oxide or ethylene carbonate can be used in place of ethylene glycol).

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, as ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substitutent groups or combinations which do not substantially interfere with the copolyester polymer formation and use of the polymer of this invention.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis (cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Among the aromatic acids, those with 8-16 carbon atoms are preferred, particularly the phenylene dicarboxylic acids, i.e., phthalic, terephthalic and isophthalic acids and their dimethyl derivatives.

Other representative aromatic dicarboxylic acids which can be used include bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$-$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

It is preferred that at least about 50% of the short segments are identical and that the identical segments form a homopolymer in the fiber-forming molecular weight range (molecular weight > 5000) having a melting point of at least 150° C. and preferably greater than 200° C. Polymers meeting these requirements exhibit a useful level of properties such as tensile strength and tear strength. Polymer melting points are conveniently determined by differential scanning calorimetry.

The copolyetherester which is preferred is prepared from the dimethyl ester of terephthalic acid, poly(tetramethylene oxide) glycol having a molecular weight of about 600-2000 and 1,4-butanediol.

Melting point of the copolyetherester elastomer can be changed by varying the amount of long-chain ester unit relative to the amount of short-chain ester unit in the composition. For this purpose, the general relationship between monomer mole fraction and polymer melting point as discussed by Flory, *Principles of Polymer Chemistry*, page 570, Cornell University Press, 1953, can be used:

$$1/T_m - 1/T_m^* = (R/\Delta H\mu) \ln N_A.$$

Where $T_m$ is the melting point of a crystalline polymer in the presence of a diluent, $T_m^*$ is the melting point of pure polymer, $N_A$ is the mole fraction of polymer in the polymer-diluent mixture, $\Delta H\mu$ is the polymer heat of fusion and R is the gas constant. This equation is roughly valid for the class of copolyetherester elastomers employed in this invention when the long-chain ester unit is treated as a noncrystallizing diluent for the crystallizing short-chain ester units. For copolyetheresters in which the major short-chain ester units are 1,4-butylene terephthalate units, $T_m^*$ is = 234° C. and $\Delta H\mu$ is = 12.1 calories per gram.

The minimum of 40° F. differential referred to earlier, between the melting points of the two copolyetheresters A and B, is intended to insure that the orientation of A will not be affected when B is heated to a temperature above its melting point to secure adequate bonding. It is important that a temperature not more than 20° F. below the melting point of A be used, as higher temperatures begin to adversely affect its orientation.

While the foregoing specification has described the elastomers as copolyetheresters, it is within the scope of the invention to employ any thermoplastic elastomers which can be oriented and have melting points sufficiently separated from each other to permit bonding without loss of orientation in the higher melting member.

The invention is illustrated by the following examples:

PREPARATION OF COPOLYETHERESTERS

Copolyetherester A is prepared by placing the following materials in an agitated flask fitted for distillation.

| | |
|---|---|
| Polytetramethyleneether glycol; number average molecular weight about 975 | 38.5 parts |
| 1,4-Butanediol | 36.5 parts |
| Dimethyl terephthalate | 60.0 parts |
| 4,4'-Bis(alpha, alphadimethylbenzyl) diphenylamine | 1.05 parts |
| Catalyst | 2.1 parts |

A stainless steel stirrer with a paddle cut to conform with the internal radius of the flask is positioned about ⅛ inch from the bottom of the flask and agitation is started. The flask is placed in an oil bath at 160° C., agitated for five minutes and then the catalyst is added. Methanol distills from the reaction mixture as the temperature is slowly raised in 250° C. over a period of one hour. When the temperature reaches 250° C., the pressure is gradually reduced to 0.3 mm. Hg within 20 minutes. The polymerization mass is agitated at 250° C./0.3 mm. Hg for 35 minutes. The resulting viscous molten product is scraped from the flask in a nitrogen (water and oxygen free) atmosphere and allowed to cool.

The polymer has an inherent viscosity of 1.40 at a concentration of 0.1 g/cdl. in m-cresol at 30° C., a Shore D hardness of 55, and a melting point of 412° F.

Copolyetherester B is prepared by substantially the same procedure used for copolyetherester A from the following materials:

| | |
|---|---|
| Polytetramethyleneether glycol; number average molecular weight about 975 | 88.0 parts |
| 1,4-Butanediol | 73.0 parts |
| Dimethyl terephthalate | 88.0 parts |
| Dimethyl isophthalate | 24.7 parts |
| 4,4'-Bis(alpha, alphadimethyl-benzyl) diphenylamine | 2.0 parts |
| Catalyst | 4.0 parts |

This polymer has an inherent viscosity about 1.45, a Shore D hardness of 40, and a melting point of 335° F.

EXAMPLE 1
PREPARATION OF HIGH STRENGTH TUBING

A 5 mil thick film of copolyetherester A was monoaxially oriented by stretching 400% in one direction. While being held in a stretched configuration, the film was heated to 350° F. and then cooled to ambient temperature at which point the restraint holding the film in the stretched configuration was released. Extended lengths of 2 inch wide strips were cut from the film in a direction parallel to the direction of orientation.

Referring to FIG. 4, one of these 2 inch wide tape 10 was helically wound under tension on an aluminum mandrel 11 of ¾ inch diameter to form a tube. The turns of the helix formed an angle of 54° to the axis of the mandrel and the tape of film forming one turn overlapped the tape of the preceeding turn by about ¼ inch. Next a 2 inch wide tape 12 of a 2 mil thick film of copolyetherester B was similarly wound to form a tube covering the tube of copolyetherester A. Finally, another tape 13 of copolyetherester A was helically wound over the tube of copolyetherester B in the same manner as the first step 10 except that the direction of the helix was reversed. The free ends of the tapes used to make this assembly were clamped to restrain the windings on the mandrel and the whole was placed in a 375° F. oven for 25 minutes, removed from the oven, allowed to cool to ambient temperature, the restraints removed, and the tubing removed from the mandrel.

The product of this procedure was a flexible hose of generally thin wall construction comprised of two concentric tubes of oriented copolyetherester A which were adhered together by an intermediate layer of fused copolyetherester B and having the ability to withstand a pressure of 95 psi without failure.

EXAMPLE 2

The procedure described in Example 2 was modified by replacing the three tapes 10, 12 and 13 with two tapes, each composed of a core of monoaxially oriented elastomer A encapsulated with an outer layer of elastomer B of lower melting point, on the principle of FIG. 1. One of these tapes was then wound helically on the mandrel in one direction, and the other wound over that in the other direction, as illustrated for tapes 12 and 13 in FIG. 4. The two were then bonded together thereafter by heating the two windings, while restraining them against shrinkage, to a temperature sufficient to fuse together the contiguous surfaces of copolyetherester elastomer B.

We claim:

1. In a flexible hose of generally thin wall construction, the hose having a core composed of a helical wrapping of thermoplastic elastomeric tape with adjacent turns overlapping, which core is surrounded by a jacket, the improvement wherein the tape which makes up the core is composed of an oriented copolyetherester elastomer that is the reaction product of poly(tetramethylene oxide)glycol having a number average molecular weight of about 975, 1,4-butanediol, and dimethylterephthalate, said elastomer having a Shore D hardness of about 55 and a melting point of about 412° F. encapsulated within a second copolyetherester elastomer of lower melting point that is the reaction product of poly(tetramethylene oxide)glycol having a number average molecular weight of about 975, 1,4-butanediol, dimethylterephthalate and dimethylisophthalate, said elastomer having a Shore D hardness of about 40 and a melting point of about 355° F. and wherein said jacket is composed of a second wrapping of the same elastomeric tape wound helically in the opposite direction from the first, the aforesaid wrappings being brought together through thermal fusion of the contiguous surfaces.

* * * * *